United States Patent [19]
Phillips et al.

[11] Patent Number: 5,664,525
[45] Date of Patent: Sep. 9, 1997

[54] SMALL ANIMAL VISUAL BURROWING MODULE

[75] Inventors: Gerald Phillips, Wantagh; Eric Sauerman; Johnny Davila Gonzalez, both of Long Beach; Marvin Goldman, North Hills, all of N.Y.

[73] Assignee: Penn-Plax, Inc., Garden City, N.Y.

[21] Appl. No.: 665,794

[22] Filed: Jun. 18, 1996

[51] Int. Cl.⁶ ................................................ A01K 1/03
[52] U.S. Cl. ........................... 119/452; 119/417; 119/702
[58] Field of Search ............................ 119/452, 421, 119/417, 474, 165, 482, 498, 501, 481, 702

[56] References Cited

U.S. PATENT DOCUMENTS

| | | | |
|---|---|---|---|
| 3,687,110 | 8/1972 | Braunhut | 119/421 X |
| 3,791,346 | 2/1974 | Willinger et al. | 119/456 |
| 3,865,082 | 2/1975 | Lovitz et al. | 119/452 |
| 4,171,682 | 10/1979 | Merino et al. | 119/452 X |
| 4,723,512 | 2/1988 | Margolis | 119/455 |
| 5,092,269 | 3/1992 | Phillips et al. | 119/452 |
| 5,186,122 | 2/1993 | Phillips et al. | 119/474 |
| 5,577,464 | 11/1996 | Wellington et al. | 119/452 |

Primary Examiner—Robert P. Swiatek
Assistant Examiner—Yvonne R. Abbott
Attorney, Agent, or Firm—Nikaido, Marmelstein, Murray & Oram LLP

[57] ABSTRACT

A small animal visual burrowing module which includes a main burrowing enclosure body having an interior space defined by opposite walls spaced a short distance apart. The burrowing enclosure body is formed by two symmetrical body pieces. The main burrowing enclosure body has an open bottom, with a wire grate mounted across the open bottom. Two generally horizontal intermediate floors are symmetrically formed in the body pieces. Each body piece including at least one laterally extended viewing window. Ventilation openings of sufficient size and number to allow for air passage through the module are provided. A plurality of through openings are provided in the walls of the enclosure body, for the passage of small animals therethrough, with each opening having an outwardly protruding portion. The through openings are positioned along and split by a division plane defining the two symmetrical body pieces. Each of the body pieces is formed with a pair of side fill hand entry openings in a shoulder portion thereof, the side fill hand entry openings being positioned along and split by the division plane defining the two symmetrical body pieces. Two removable side fill hand entry doors close the side fill hand entry openings. Connecting devices are connected to the protruding portion of each opening passage for attaching the two body pieces together.

14 Claims, 4 Drawing Sheets

SMALL ANIMAL VISUAL BURROWING MODULE

BACKGROUND OF THE INVENTION

The present invention relates to an improved enclosure module and environment habitat for use by home hobbyists to maintain and confine small animals such as hamsters, gerbils and mice. Small animal enclosures have been known and used in both the home and laboratory setting for many years. See for example; U.S. Pat. Nos. 3,791,346; 3,865,082; 4,723,512; 5,092,269; and 5,186,122. More particularly, the present invention provides a small animal visual burrowing module with advantageous features which make it easier to maintain and more fun for the home hobbyist to keep these animals. It is commonly known that home hobbyists enjoy the ability to connect an assortment of enclosure modules and accessories, such as exercise wheels and feeders, to a main enclosure unit. Such a feature provides the hobbyist with the ability to customize the animals home into interesting and aesthetically pleasing configurations. This feature also allows the animal to move more freely through an enlarged environment and to encounter a variety of challenges to enhance exercise and well being. Further, the ability to attach a plurality of enclosures together makes it easier to keep multiple animals in a comprehensive small animal environment.

It is also known that since animals such as hamsters and gerbils are naturally tunneling animals it is beneficial to provide these habitats with tunnel like pathways and connections. See for example U.S. Pat. Nos. 5,092,269 and 5,186,122, to Phillips et al, both of which are specifically incorporated herein by reference. The present invention, by utilizing a specifically shaped module, enables the hobbyist to enjoy more exciting watching of the animals as they explore a tunnel like environment which is easily visible from the outside.

SUMMARY OF THE INVENTION

It is an object of the present invention to provide a small animal environment which allows ease of use for the home hobbyist. It is a further object of the present invention to provide a small animal visual burrowing module that can be used alone or together with other modules or units, and which simulates a tunnel environment. It is a still further object of the present invention to provide a small animal visual burrowing module environment that will allow for easy cleaning and care.

The present invention is a small animal visual burrowing module which includes a main burrowing enclosure body having an interior space defined by opposite walls spaced a short distance apart. Typically, they are spaced about 2 inches apart. This is to give the small animal a sense of closeness. The burrowing enclosure body is formed by two symmetrical body pieces. The symmetrical body pieces as well as other components of the module as discussed below can be fabricated from a transparent thermoplastic material. This material can be tinted to various degrees to provide a better appearance or to darken the particular component. The module can be approximately 15 inches longitudinally and approximately 12 inches laterally. It is sized to be usable alone or can be place into larger enclosures, such as large tanks often used by hobbyists to keep small animals.

Ventilation openings of sufficient size and number to allow for air passage through the module are provided in each of the pieces. A plurality of through openings are present in the walls of the enclosure body, for the passage of small animals therethrough, each opening having an outwardly protruding portion. All of the through openings are positioned along and split by a division plane defining the two symmetrical body pieces. Connecting means connected to the protruding portion of each opening passage are provided for attaching the two body pieces together and for the attachment of small animal living accessories. The connecting means preferably comprises an annular ring. These are attachable to tubes, other enclosures, and various accessories such as exercise wheels, feeders, and water bottles. The through openings must be of sufficient size for an animal such as a hamster to crawl through, approximately 1 to 4 inches in diameter.

The main burrowing enclosure body can have an open bottom. In such a case, the module further includes a wire grate mounted across the open bottom, and a stand member supporting the main burrowing enclosure body and forming a litter tray below the wire grate. Litter, such as pine shavings can be placed in the litter tray and animal droppings fall through grid into the tray. The tray may then be removed for cleaning. In addition, nesting materials, such as shredded corn husks, large wood shavings and the like are desirably placed in the enclosure body for the small animals to burrow in.

In this regard, the enclosure body has at least one generally horizontal intermediate floor symmetrically formed in the body pieces. This forms an intermediate platform for the small animals to climb to and crawl around upon. Preferably, two generally horizontal intermediate floors symmetrically are formed in the body pieces. The term "generally horizontal" is being used to mean surfaces that if extended would not form a large acute angle with a strictly horizontal surface. This does not preclude undulating surfaces as shown nor does it preclude slanted surfaces. The surface of the intermediate floor or floors can be ribbed or plain. Reinforcing members can be provided laterally of the enclosure body spaced along the floor or floors. At opposite ends of an upper floor, rounded laterally protruded areas having a large concentration of ventilation holes can be provided in each of the body pieces.

Each body piece can include at least one laterally extended viewing window. "Laterally" is being used to mean perpendicular to a longitudinal axis of the module taken on a horizontal plane with the module in the usual upright position. Preferably, such an extended viewing window is centrally formed of the enclosure body. It is believed that such a structure gives the small animals a sense of a carved out or burrowed nest while giving the hobbyist a unique viewing area. If two intermediate floors are provided, the viewing window is preferably provided therebetween. If desired, the viewing window can be provided on only one of the body pieces.

There can be a difficulty in adding litter to the middle of the module during use. Additionally, it can be difficult to catch one of the small animals when desired. To address these concerns, each of the body pieces is formed with a pair of side fill hand entry openings in a shoulder portion thereof. The side fill hand entry openings are positioned along and split by the division plane defining the two symmetrical body pieces. Two removable side fill hand entry doors are provided closing the side fill hand entry openings. In order to fit such doors, channel edges formed on side portions of the side fill hand entry openings, and flanges formed on sides of the doors, slidingly engageable with the channel edges of the side portions. The doors can be provided with laterally extending ribs for reinforcement and aesthetics. An upper portion of each door can be designed to follow the shape of the enclosure body. A lower portion of each door can be provided with an extending tongue which engages an receiving opening formed in the outer surface of each of the body pieces immediately below the side fill hand entry opening.

The body pieces can be formed with a handle portion defined by laterally inwardly extending walls meeting at the division plane. A top surface of such handle portion can form an additional intermediate floor and can be plain or ribbed. It is preferable that all internal edges in the module are rounded to decrease gnawing of the module by the small animal.

As noted above, the small animal visual burrowing module can be connected to a small animal living accessory. As such, at least one bubble cap is preferably attachable to the connecting means. Alternatively or in conjunction therewith, the small animal living accessory is a tunnel tube and the tunnel tube is at least one tube shaped as a quarter round tube wherein four connected tubes form a full circular loop. The present invention may also be used with a quarter round tube, previously disclosed in U.S. Pat. Nos. 5,092,269 and 5,186,122, incorporated by reference herein, which is attachable to the enclosure at the through hole using the connecting rings generally formed from a pliable plastic material. The quarter round tubes may be used to form a top arch tunnel, also beneficial for animal play and exercise. Through openings on top of the enclosure may be spaced in such a manner that when two connected quarter round tubes are joined an arched passageway is formed. The small animal may then crawl up out of the module, through the arched quarter round tubes, and back down to reenter the module.

BRIEF DESCRIPTION OF THE DRAWINGS

The above and other objects and advantages of the present invention will become readily apparent by reference to the following detailed description when considered in conjunction with the accompanying drawings wherein.

Like references refer to like parts throughout the several views of the drawings.

DETAILED DESCRIPTION OF THE INVENTION

Figure 1:
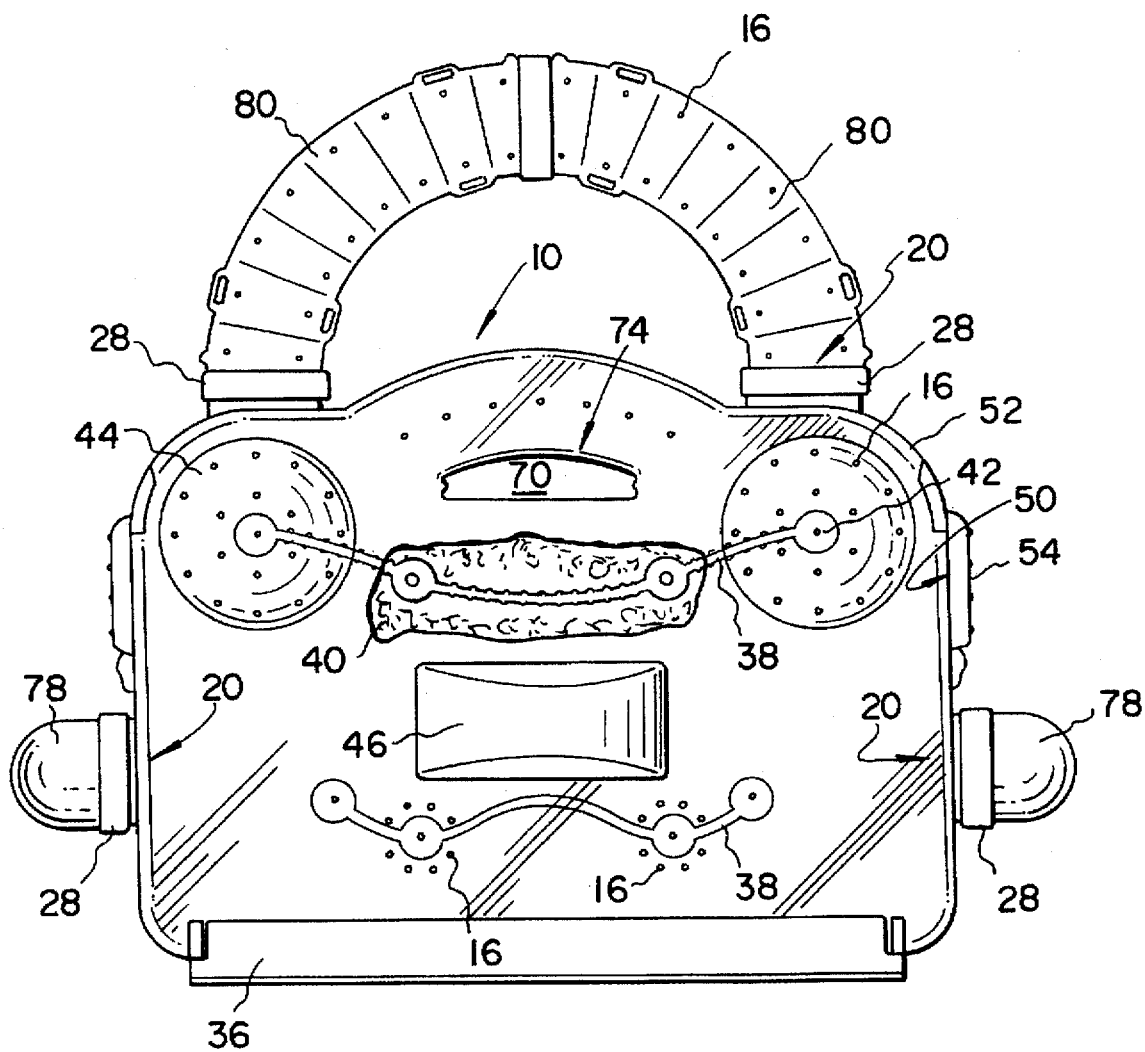
FIG. 1 is a front view of the assembled small animal visual burrowing module in accordance with the present invention.

FIG. 1 shows a small animal visual burrowing module in accordance with the present invention. It includes a main burrowing enclosure body 10 having an interior space defined by opposite walls spaced a short distance apart. Preferably, this distance is about two inches. The burrowing enclosure body 10 is formed by two symmetrical body pieces 12, 14 divided by a division plane 24. The symmetrical body pieces 12, 14 as well as other components of the module as discussed below can be fabricated from a transparent thermoplastic material.

Figure 2:
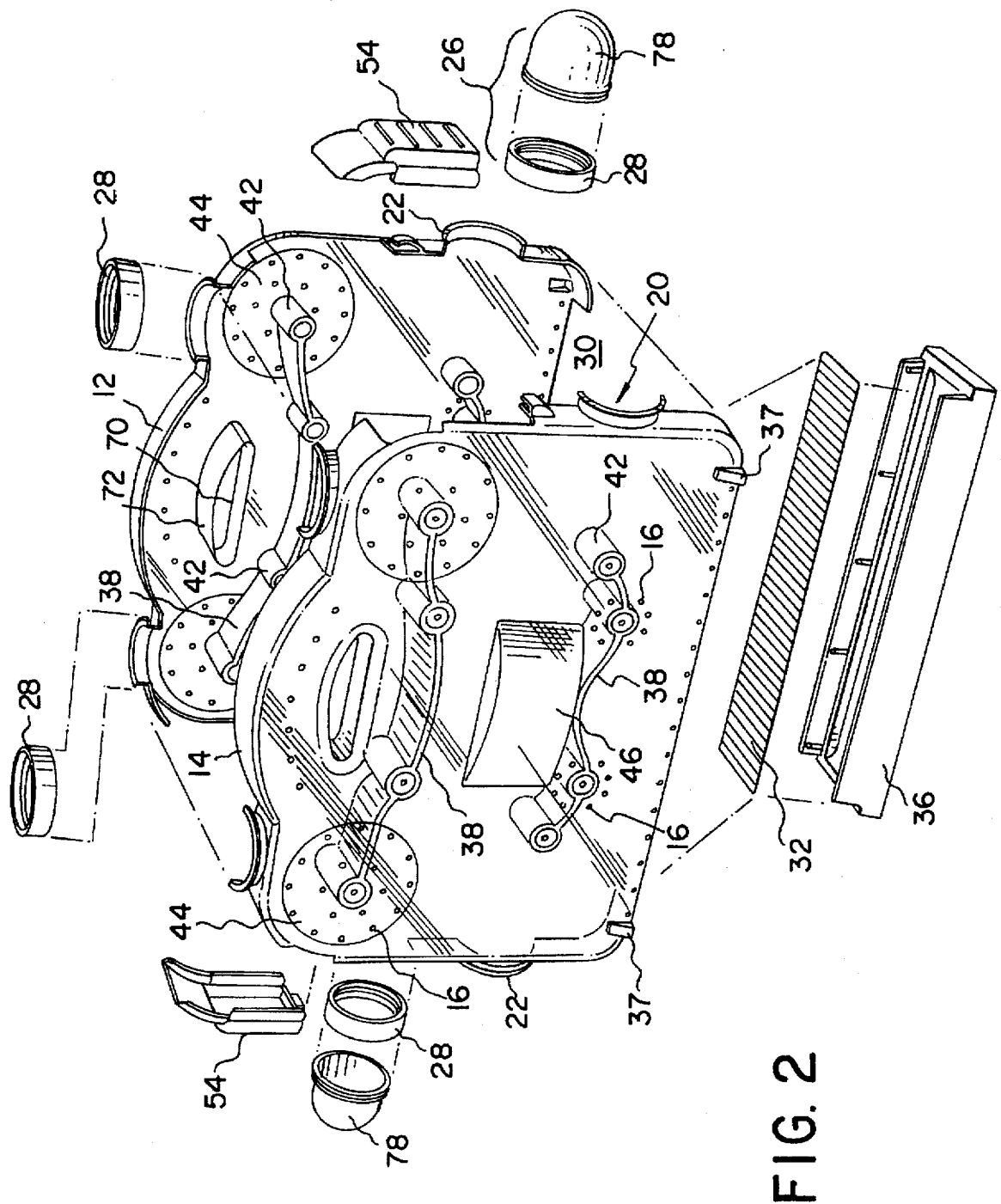
FIG. 2 is an exploded view of FIG. 1.
Figure 3:
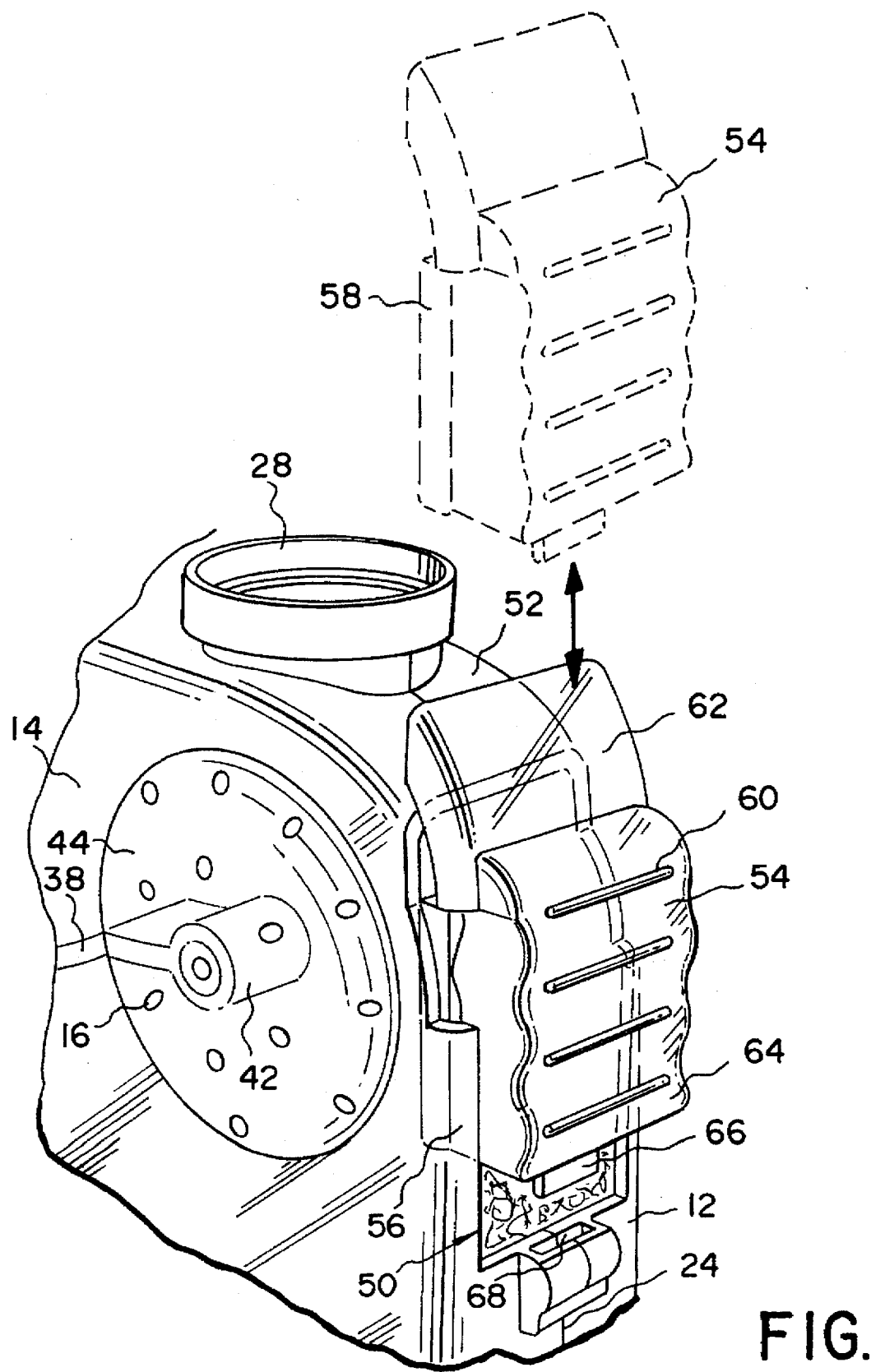
FIG. 3 is a partial perspective view showing the side fill hand entry door.

Ventilation openings 16 are provided in the walls of the enclosure body 10. As shown in FIGS. 1-3, the ventilation opening 16 can be aesthetically positioned. Rounded laterally protruded areas 44 having a large concentration of ventilation holes 16 can be provided in each of the body pieces.

A plurality of through openings 20 are provided in the walls of the enclosure body 10 for the passage of small animals therethrough. Each of the through openings 20 has an outwardly protruding portion 22. The outwardly protruding portion can have a radially outwardly extending flange if desired. The through openings 20 are positioned along and are split by the division plane 24 defining the two symmetrical body pieces 12, 14. Connecting means 26 are connected to the protruding portion 22 of each opening passage 20 for attaching the two body pieces 12, 14 together and for the attachment of small animal living accessories, such as those disclosed in U.S. Pat. Nos. 5,092,269 and 5,186,122, expressly incorporated herein by reference. The connecting means 26 can comprise an annular ring 28 generally formed from a pliable plastic material.

Figure 4:
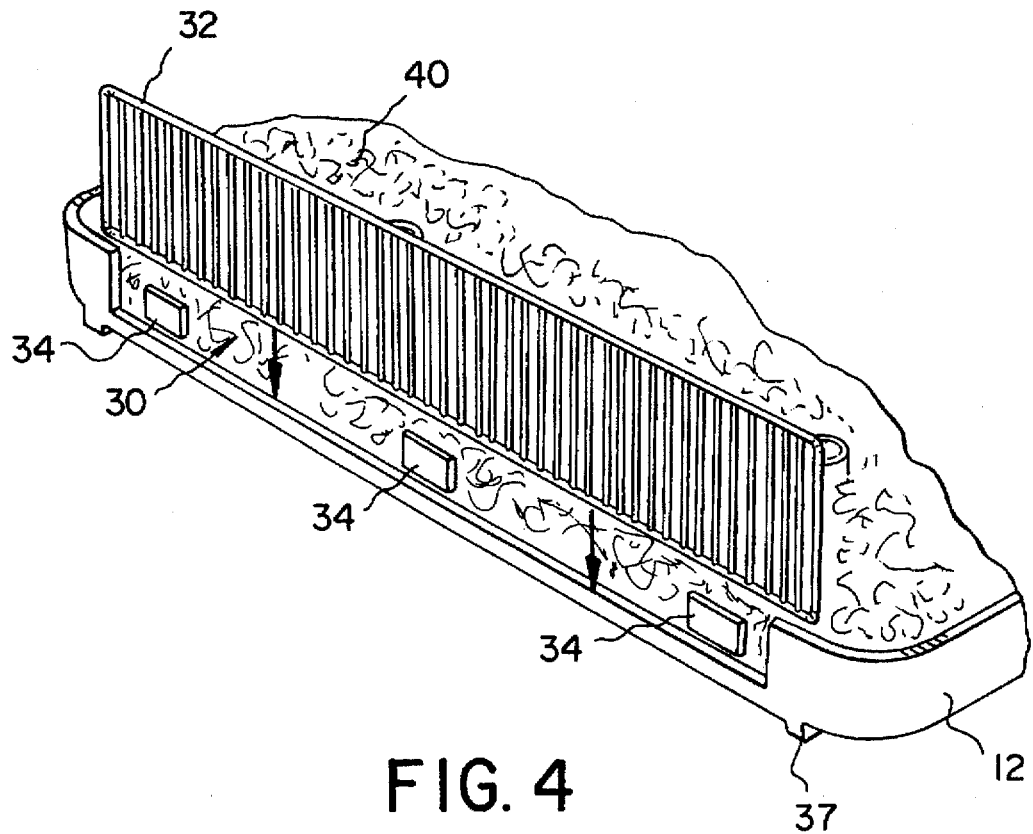
FIG. 4 is a partial disassembled perspective view showing the positioning and fitting of the wire grate member.
Figure 5:
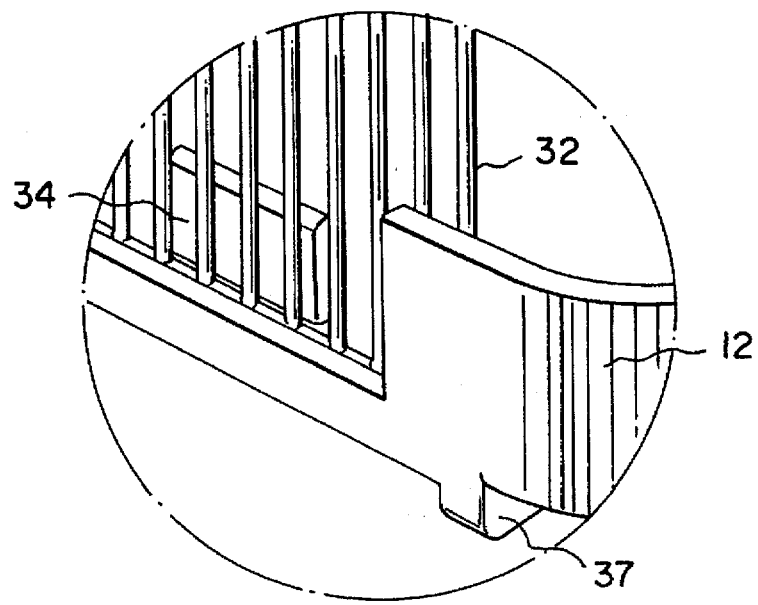
FIG. 5 is a partial assembled perspective view showing a detail of FIG. 4.

The main burrowing enclosure body 10 has an open bottom 30. A wire grate 32 is mounted across the open bottom and held in place by grate mounting members 34 molded in each of the body pieces 12, 14 adjacent and above the open bottom 30 as shown in FIGS. 4 and 5. A stand member 36 is provided and sized to engage the bottom of the enclosure body 10 between support engagement members 37. The stand member 36 is designed to function as a litter tray below the wire grate to enable relatively easy clean-up of droppings from the small animals without the necessity to completely disassemble the small animal visual burrowing module. The supports 37 also enable the enclosure body 10 to be stood up securely even without the support stand while the support stand 36 is being cleaned.

At least one generally horizontal intermediate floor 38 is formed in the body pieces and extends along a proportion of the longitudinal length of the enclosure body 10. Preferably at least two intermediate floors 38 are symmetrically formed in the body piece. There is no requirement for these floors to be absolutely horizontal and, in fact, it is preferred that they are "generally horizontal". That is, in the preferred embodiment, the intermediate floors 38 are undulating so as to simulate the non-uniformity of a small animal burrow. The top and/or bottom surfaces of the intermediate floors 38 can be plain or can be ribbed. The enclosure body 10, especially in the vicinity of the wire grate, and the intermediate floors can be partially or fully filled with nesting materials 40, such as shredded corn husks or wood shavings to provide something for the small animals to burrow through. At the opposite ends of the intermediate floors 38 and at intermediate portions thereof are provided reinforcement members 42 extending across and connecting between both body pieces 12, 14. The reinforcing members 42 at the opposite ends of the intermediate floors also provide a more largely rounded surface to reduce the possible number of corners upon which the small animals can gnaw.

As noted above, at opposite ends of an upper intermediate floor 38, rounded laterally protruded areas 44 can be provided having a large concentration of ventilation holes 16.

Each body piece 12, 14 can be provided with at least one laterally extended viewing window 46 which is a portion of the side wall of the body piece extended laterally outward from the burrowing module in the manner of a bay window. Preferably, this is positioned above one of the intermediate floors 38.

Each of the body pieces 12, 14 can be formed with a pair of side fill hand entry openings 50 in a shoulder portion 52 thereof. The side fill hand entry openings 50 are positioned along and split by the division plane 24 defining the two symmetrical body pieces 12, 14. These openings 50 are provided to enable filling of the nesting materials 40 into the enclosure body 10 without having to take the enclosure body 10 completely apart. Further, they also enable easier capture and return of the small animals. The openings 50 are each closed by a removable side fill hand entry door 54 shown in FIGS. 1–3. Channel edges 56 are formed at each side of the side fill hand entry openings 50 and are engaged by flanges 58 formed on the sides of the doors 54. The doors 54 can be provided with laterally extending ribs 60 for reinforcement and aesthetics. An upper portion 62 of each door 54 can be designed to follow the shape of the shoulder portion 52 of the enclosure body 10. A lower portion 64 of each door 54 can be provided with an extending tongue 66 which engages a receiving opening 68 formed in the outer surface of each of the body pieces 12, 14 immediately below the side fill hand entry opening 50.

The body pieces 12, 14 can be formed with a handle portion 70 defined by laterally inwardly extending walls 72 meeting at the division plane 24 in the interior of the enclosure body 10. A top surface 74 of such a handle portion 70 can form an additional intermediate floor and may be plain or may have laterally extending ribs.

The small animal visual burrowing module can be connected to a small animal living accessory. Such a small animal living accessory can comprise a bubble cap 78 or a tunnel tube 80. Preferably, at openings on the top of the enclosure, the tunnel tube includes quarter round tubes forming a top arch tunnel as shown in FIG. 1. The quarter tubes are also formed with ventilation holes 16 and may have internal spaced apart circumferential ribs.

It is readily apparent that the above described small animal environment meets all of the objectives mentioned as well as providing other advantages for maintaining small animals. It should be understood that the specific form of the invention here and above described is intended to be representative only, as certain modifications within the scope of these teachings will be apparent to those skilled in the art of small animal care.

Accordingly, reference should be made to the following claims in determining the full scope of the invention.

What is claimed is:

1. A small animal visual burrowing module comprising:
    a main burrowing enclosure body having an interior space defined by opposite walls spaced a short distance apart, said burrowing enclosure body being formed by two symmetrical body pieces;
    ventilation openings of sufficient size and number to allow for air passage through the module;
    a plurality of through openings in the walls of the enclosure body, for the passage of small animals therethrough, each opening having an outwardly protruding portion, said through openings being positioned along and split by a division plane defining said two symmetrical body pieces; and
    connecting means connected to the protruding portion of each opening passage and attaching said two body pieces together and for the attachment of small animal living accessories;
    said connecting means comprising an annular ring.

2. The small animal visual burrowing module according to claim 1, wherein said main burrowing enclosure body has an open bottom; and said module further comprises a wire grate mounted across said open bottom, and a stand member supporting said main burrowing enclosure body and forming a litter tray below said wire grate.

3. The small animal visual burrowing module according to claim 1, further comprising at least one generally horizontal intermediate floor symmetrically formed in said body pieces.

4. The small animal visual burrowing module according to claim 1, comprising two generally horizontal intermediate floors symmetrically formed in said body pieces.

5. The small animal visual burrowing module according to claim 1, wherein at least one body piece includes at least one laterally extended viewing window.

6. The small animal visual burrowing module according to claim 1, wherein each of said body pieces is formed with a pair of side fill hand entry openings in a shoulder portion thereof, said side fill hand entry openings being positioned along and split by said division plane defining said two symmetrical body pieces; and said module further comprises two removable side fill hand entry doors closing said side fill hand entry openings.

7. The small animal visual burrowing module according to claim 6, further comprising channel edges formed on side portions of said side fill hand entry openings, and flanges formed on sides of said doors, slidingly engageable with said channel edges of said side portions.

8. The small animal visual burrowing module according to claim 1, wherein said small animal living accessory comprises at least one bubble cap attachable to connecting means.

9. The small animal visual burrowing module according to claim 1, wherein said body pieces are formed with a handle portion defined by laterally inwardly extending walls meeting at said division plane.

10. The small animal visual burrowing module according to claim 1, wherein all internal edges in said module are rounded to decrease gnawing of said module by said small animal.

11. The small animal visual burrowing module according to claim 1, wherein said small animal living accessory is a tunnel tube and the tunnel tube is at least one tube shaped as a quarter round tube wherein four connected tubes form a full circular loop.

12. The small animal visual burrowing module according to claim 11, further comprising opening passages on a top wall of the enclosure the opening passages spaced in a relationship that allows two connected quarter round tubes to form an arched passageway between the opening passages when the quarter round tubes are engaged with the opening passages.

13. The small animal visual burrowing module according to claim 1, wherein said body pieces are fabricated from a transparent thermoplastic material.

14. The small animal visual burrowing module comprising
    a main burrowing enclosure body having an interior space defined by opposite walls spaced a short distance apart, said burrowing enclosure body being formed by two symmetrical body pieces, said main burrowing enclosure body having an open bottom, at least one generally horizontal intermediate floor being symmetrically formed in said body pieces, each body piece including at least one laterally extended viewing window;
    ventilation openings of sufficient size and number to allow for air passage through the module;
    a plurality of through openings in the walls of the enclosure body, for the passage of small animals therethrough, each opening having an outwardly protruding portion, said through openings being positioned along and split by a division plane defining said two symmetrical body pieces;
    each of said body pieces being formed with a pair of side fill hand entry openings in a shoulder portion thereof, said side fill hand entry openings being positioned along and split by said division plane defining said two symmetrical body pieces;

two removable side fill hand entry doors closing said side fill hand entry openings;

connecting means connected to the protruding portion of each opening passage and attaching said two body pieces together and for the attachment of small animal living accessories;

at least one bubble cap attachable to each said connecting means;

a wire grate mounted across said open bottom;

a stand member supporting said main burrowing enclosure body and forming a litter tray below said wire grate;

opening passages formed on a top wall of the enclosure, the opening passages being spaced in a relationship that allows two connected quarter round tubes to form an arched passageway between the opening passages when the quarter round tubes are engaged with the opening passages.

* * * * *